United States Patent
Gallon et al.

(10) Patent No.: US 8,667,953 B2
(45) Date of Patent: Mar. 11, 2014

(54) CYLINDER DEACTIVATION TO REDUCE FUEL ENRICHMENT AFTER FUEL CUTOFF MODES

(75) Inventors: Robert Jack Gallon, Northville, MI (US); Alan W. Hayman, Romeo, MI (US); Robert S. McAlpine, Lake Orion, MI (US); James J. Mazzola, III, Dryden, MI (US)

(73) Assignee: GM Global Technology Operations LLC

( * ) Notice: Subject to any disclaimer, the term of this patent is extended or adjusted under 35 U.S.C. 154(b) by 649 days.

(21) Appl. No.: 12/578,843

(22) Filed: Oct. 14, 2009

(65) Prior Publication Data

US 2011/0083639 A1    Apr. 14, 2011

(51) Int. Cl.
*F02D 13/06*    (2006.01)
*F02D 17/04*    (2006.01)

(52) U.S. Cl.
USPC .................... 123/321; 123/481; 123/198 DB; 123/198 F; 123/198 DC

(58) Field of Classification Search
CPC ....... F02D 1/0087; F02D 17/02; F02D 13/06; F02D 13/0005; F02D 41/0087; F02D 17/04; F01M 1/24
USPC ....... 123/481, 198 F, 493, 179.4, 321, 198 D, 123/198 DB, 198 DC, 491; 701/101, 102, 701/103, 104, 105, 106, 109, 112, 113
See application file for complete search history.

(56) References Cited

U.S. PATENT DOCUMENTS

| | | | |
|---|---|---|---|
| 5,531,203 A * | 7/1996 | Komatsuda et al. .......... | 123/481 |
| 6,886,649 B2 | 5/2005 | Wakashiro et al. | |
| 6,953,021 B2 * | 10/2005 | Wakashiro et al. ........... | 123/321 |
| 7,234,435 B2 * | 6/2007 | Lewis et al. ................ | 123/198 F |
| 7,258,101 B1 | 8/2007 | McDonald | |
| 7,549,406 B2 * | 6/2009 | Lewis ......................... | 123/198 F |
| 7,743,747 B2 * | 6/2010 | Lewis et al. ................ | 123/198 F |
| 7,810,473 B2 * | 10/2010 | Ezaki et al. .................. | 123/481 |
| 2009/0048763 A1 * | 2/2009 | Nishikiori et al. ............ | 701/103 |

FOREIGN PATENT DOCUMENTS

JP    2004-143990    *   5/2004

* cited by examiner

*Primary Examiner* — Stephen K Cronin
*Assistant Examiner* — Raza Najmuddin

(57) ABSTRACT

A system includes a fuel cutoff module and a cylinder deactivation module. The fuel cutoff module generates a fuel cutoff signal when a deceleration fuel cutoff condition occurs, wherein fueling to M cylinders of an engine is disabled based on the fuel cutoff signal, and wherein M is an integer greater than or equal to one. The cylinder deactivation module deactivates the M cylinders in response to the fuel cutoff signal.

14 Claims, 3 Drawing Sheets

CYLINDER DEACTIVATION TO REDUCE FUEL ENRICHMENT AFTER FUEL CUTOFF MODES

FIELD

The present disclosure relates to engine control systems, and more particularly to systems and methods for reducing fuel enrichment after fuel cutoff modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines emit exhaust gas that includes carbon dioxide, water, carbon monoxide (CO), nitrogen oxides (NOx), unburned hydrocarbons (HC), and other compounds. Exhaust systems typically include a catalyst that reduces the levels of CO, NOx, and HC in the exhaust gas by chemically converting these gases into carbon dioxide, nitrogen, and water. The catalyst reduces the levels of the gases by catalyzing a reaction between the gases and oxygen. The catalyst stores oxygen when operating under lean fuel conditions and releases oxygen when operating under rich fuel conditions.

A vehicle may operate in a fuel cutoff mode during which fueling to the cylinders is disabled. The fuel cutoff mode may occur when the vehicle is decelerating with no throttle input from a driver and the engine is acting as a brake. During the fuel cutoff mode, the engine pumps air through the exhaust system rather than exhaust gas, resulting in delivery of excess oxygen to the catalyst. The catalyst stores the oxygen until a maximum oxygen storage amount is reached. When the maximum oxygen storage amount is exceeded, the ability of the catalyst to convert NOx emissions may be substantially reduced, resulting in NOx breakthrough. Therefore, when fueling resumes, an increased amount of fueling is delivered to the engine to cause rich fuel conditions. The rich fuel conditions decrease the amount of oxygen and improves NOx conversion.

SUMMARY

A system includes a fuel cutoff module and a cylinder deactivation module. The fuel cutoff module generates a fuel cutoff signal when a deceleration fuel cutoff condition occurs, wherein fueling to M cylinders of an engine is disabled based on the fuel cutoff signal, and wherein M is an integer greater than or equal to one. The cylinder deactivation module deactivates the M cylinders in response to the fuel cutoff signal.

A method includes generating a fuel cutoff signal when a deceleration fuel cutoff condition occurs, wherein fueling to M cylinders of an engine is disabled based on the fuel cutoff signal, and wherein M is an integer greater than or equal to one, and deactivating the M cylinders in response to the fuel cutoff signal.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

Figure 1:
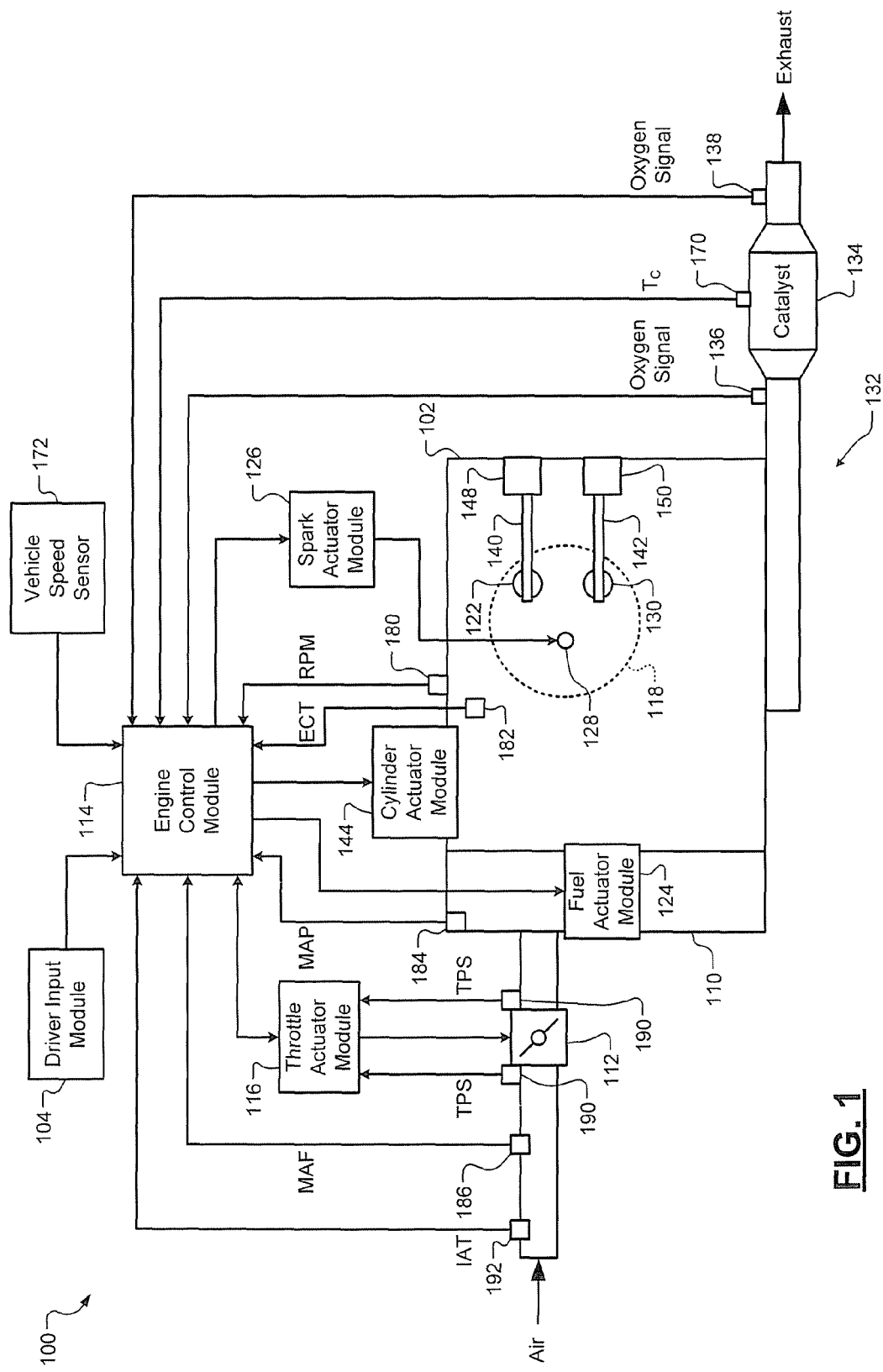
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

During the fuel cutoff mode, excess oxygen is stored by the catalyst, increasing the oxygen storage amount of the catalyst and reducing the ability of the catalyst to convert NOx emissions. When fueling resumes, increased fueling reduces the oxygen storage amount. However, the increased fueling reduces fuel efficiency and may require additional time to reduce the oxygen storage amount. Thus, it is desirable to prevent increases in the oxygen storage amount when the vehicle operates in the fuel cutoff mode. Preventing an increase in the oxygen storage amount reduces the need for fuel enrichment when the fuel cutoff mode ends.

An enrichment reduction system according to the present disclosure decreases the amount of air pumped through the catalyst during the fuel cutoff mode. The enrichment reduction system determines when fuel to a cylinder has been disabled in fuel cutoff mode. The enrichment reduction system deactivates the cylinder to prevent air from being pumped by the cylinder through the exhaust system during the fuel cutoff mode. When fueling resumes, the need for fuel enrichment of the engine is reduced.

Referring now to FIG. 1, a functional block diagram of an exemplary engine system 100 is presented. The engine system 100 includes an engine 102 that combusts an air/fuel mixture to produce drive torque for a vehicle based on output from a driver input module 104. For example only, the driver input module 104 may output a position signal based on a position of an accelerator input device, such as an accelerator pedal.

The engine 102 draws air into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110. The ECM 114 may implement the enrichment reduction system of the present disclosure. Air from the intake manifold 110 flows into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders.

An intake valve 122 regulates the flow of air from the intake manifold 110 into the cylinder 118. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders during a fuel cutoff mode.

The injected fuel mixes with air and creates an air/fuel mixture in the cylinder 118. A piston (not shown) within the cylinder 118 compresses the air/fuel mixture. Based upon a signal from the ECM 114, a spark actuator module 126 may energize a spark plug 128 in the cylinder 118, which ignites the air/fuel mixture. The timing of the spark may be specified relative to the time when the piston is at its topmost position, referred to as top dead center (TDC). In diesel engines, the spark actuator module 126 and spark plug 128 may be omitted.

The combustion of the air/fuel mixture drives the piston down, thereby driving a rotating crankshaft (not shown). The piston then begins moving up again and expels the byproducts of combustion through an exhaust valve 130. The byproducts of combustion including exhaust gas are exhausted from the vehicle via an exhaust system 132.

A catalyst 134 in the exhaust system 132 reduces amounts of gases such as CO, HC, and NOx emitted by the engine 102. The catalyst 134 reduces the amounts of the gases by catalyzing a reaction between the gases and oxygen. The catalyst 134 includes a property known as oxygen storage capacity (OSC). OSC refers to an ability of the catalyst 134 to store excess oxygen when the engine 102 operates under lean conditions and to release oxygen when the engine 102 operates under rich conditions. The amount of oxygen stored by the catalyst may be referred to as an oxygen storage amount. Lean conditions may occur when the ratio of the air/fuel mixture is greater than a stoichiometric air/fuel mixture. Rich conditions may occur when the ratio of the air/fuel mixture is less than a stoichiometric air/fuel mixture.

The oxygen storage amount may increase or decrease depending on the ratio of the air/fuel mixture. During lean conditions, the oxygen storage amount may increase because the air/fuel mixture includes excess oxygen. During rich conditions, the stored oxygen may decrease because the air/fuel mixture includes excess fuel. The excess oxygen is stored in the catalyst 134 until a maximum storage amount is attained. The maximum storage amount may depend on the size and composition of the catalyst 134. The maximum storage amount may depend on the temperature of the catalyst 134. When the catalyst 134 reaches the maximum storage amount, NOx breakthrough may occur, reducing the ability of the catalyst 134 to convert NOx emissions.

A vehicle may operate in a fuel cutoff mode in which the fuel actuator module 124 cuts off fueling (i.e., stops fuel flow) to one or more cylinders. Fuel cutoff mode may occur when the vehicle is operating in an "overrun" or "deceleration" condition. A vehicle traveling with no throttle input from the driver (i.e., no input to the accelerator input device) and the engine 102 acting as a brake (i.e., producing negative torque) may be described as operating in the overrun or deceleration condition. When deceleration conditions exist, fueling may be disabled in a deceleration fuel cutoff (DFCO) mode. DFCO mode may be implemented to increase fuel economy and/or increase engine braking. During DFCO mode, the engine 102 pumps air through the exhaust system 132, resulting in delivery of excess oxygen to the catalyst 134.

Oxygen sensors may be used to determine amounts of oxygen in the exhaust gas. The oxygen sensors generate oxygen signals that indicate oxygen amounts in the exhaust gas. A first oxygen sensor 136 may generate an upstream oxygen signal that indicates an oxygen amount upstream from the catalyst 134. A second oxygen sensor 138 may generate a downstream oxygen signal that indicates an oxygen amount downstream from the catalyst 134. The ECM 114 may determine the oxygen storage amount based on the upstream and/or the downstream oxygen signals.

An intake camshaft 140 may control opening and closing of the intake valve 122. An exhaust camshaft 142 may control opening and closing of the exhaust valve 130. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. A single camshaft may control opening and closing of the intake valve 122 and the exhaust valve 130.

A cylinder actuator module 144 may deactivate the cylinder 118 by disabling opening of the intake valve 122 and/or the exhaust valve 130. In various implementations, the cylinder actuator module 144 may include a hydraulic system that selectively decouples the intake and/or exhaust valves from the corresponding camshafts for one or more cylinders in order to deactivate those cylinders. For example only, valves for half of the cylinders are either hydraulically coupled or decoupled as a group by the cylinder actuator module 144.

A temperature sensor 170 may indicate the temperature ($T_C$) of the catalyst 134. A vehicle speed sensor 172 may indicate the speed of the vehicle (VS) based on a rotational velocity of a drive wheel or an output speed of a transmission. An RPM sensor 180 may measure the speed of the crankshaft in revolutions per minute (RPM). An engine coolant temperature (ECT) sensor 182 may indicate a temperature of coolant in the engine 102 and/or the engine 102. The ECT sensor 182 may be located within the engine 102 or at other locations where the coolant is circulated, such as a radiator (not shown).

A manifold absolute pressure (MAP) sensor 184 may indicate pressure within the intake manifold 110. In various implementations, the MAP sensor 184 may measure engine vacuum, which is the difference between ambient air pressure and the pressure within the intake manifold 110. A mass airflow (MAF) sensor 186 measures a mass flow rate of air flowing into the intake manifold 110. In various implementations, the MAF sensor 186 may be located in a housing that also includes the throttle valve 112.

The throttle actuator module 116 may monitor the position of the throttle valve 112 using one or more throttle position sensors (TPS) 190. An intake air temperature (IAT) sensor 192 may measure the ambient temperature of air being drawn into the engine 102. Other sensors 194 may include other temperature sensors in the exhaust system 132, camshaft position sensors, and other engine sensors. The ECM 114 may use signals from the sensors to make control decisions for the engine system 100.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the fuel actuator module 124 and the cylinder actuator module 144. For these actuators, the actuator values may correspond to fueling rate and number of cylinders and/or valves activated, respectively. The ECM 114 may control actuator values in order to generate a desired torque from the engine 102. The ECM 114 may control actuator values to implement the enrichment reduction system of the present disclosure.

Figure 2:
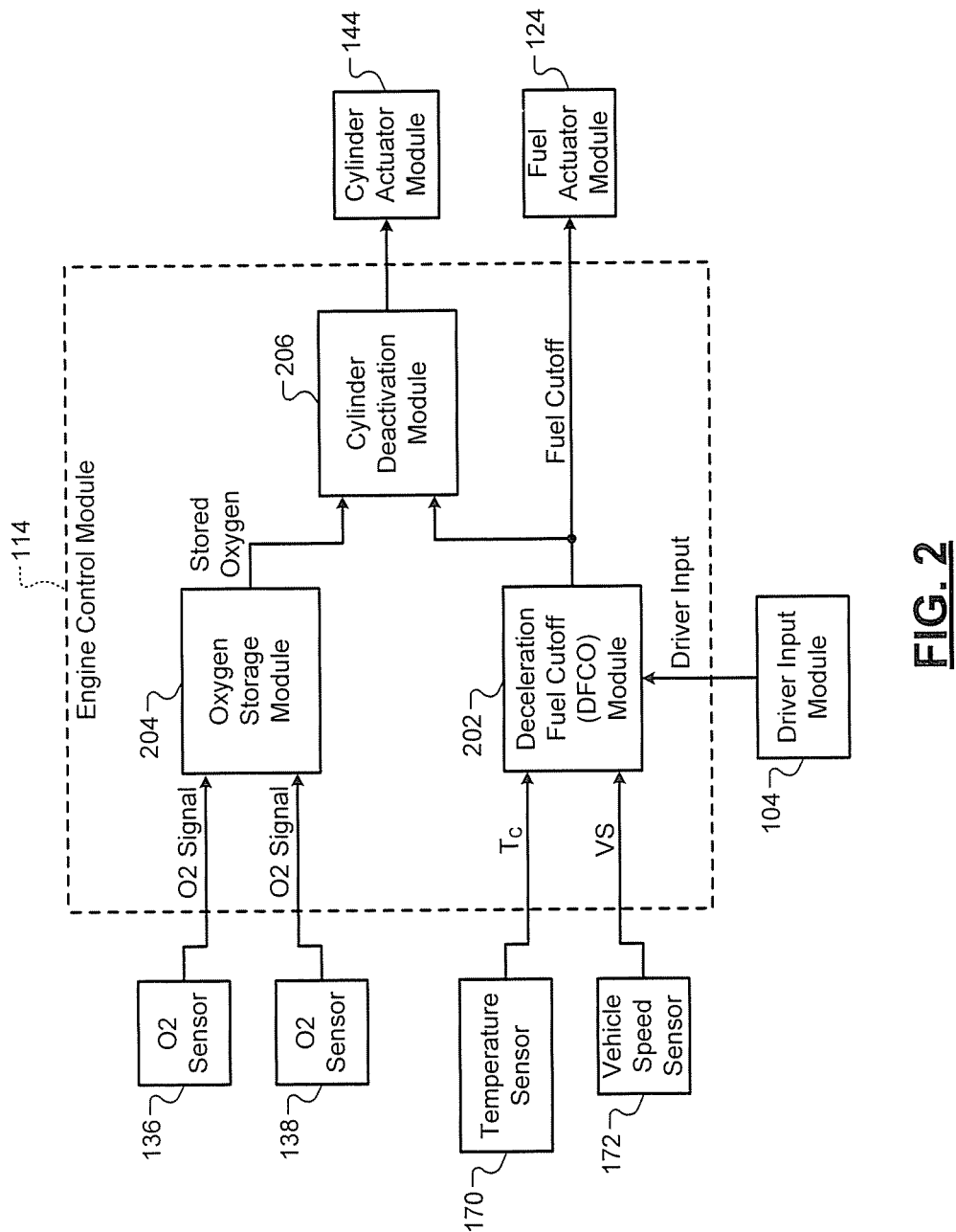
FIG. 2 is a functional block diagram of an engine control module according to the principles of the present disclosure.

Referring now to FIG. 2, a functional block diagram of an exemplary engine control module (ECM) 114 includes a deceleration fuel cutoff (DFCO) module 202, an oxygen storage module 204, and a cylinder deactivation module 206. The DFCO module 202 may generate a fuel cutoff signal when overrun conditions exist. Fueling to the cylinder 118 is disabled in response to the fuel cutoff signal. The oxygen storage module 204 determines the oxygen storage amount of the catalyst 134. The cylinder deactivation module 206 deactivates the cylinder 118 in response to the fuel cutoff signal and the oxygen storage amount.

The DFCO module 202 may enter DFCO mode when overrun conditions occur. Overrun conditions may occur based on input from the driver input module 104, the vehicle speed sensor 172, and the temperature sensor 170. For example only, when vehicle speed is greater than a speed threshold, the temperature of the catalyst 134 is less than a temperature threshold, and the position of the accelerator input device is less than a position threshold, the DFCO module 202 may enter DFCO mode. The DFCO module 202 may generate a fuel cutoff signal when in DFCO mode. The fuel actuator module 124 may halt injection of fuel to the cylinder 118 based on the fuel cutoff signal. The fuel actuator module 124 may halt injection of fuel to all cylinders of the engine 102 based on the fuel cutoff signal.

The oxygen storage module 204 determines the oxygen storage amount of the catalyst 134. The oxygen storage module 204 may determine the oxygen storage amount while the engine 102 is being fueled and during the DFCO mode. For example only, the oxygen storage module 204 may determine the oxygen storage amount at a time before the DFCO module 202 cuts fuel.

The oxygen storage amount may be determined based on oxygen amounts indicated by one or more of the oxygen sensors 136 and 138. For example only, when the second oxygen sensor 138 indicates an oxygen amount that is greater than a threshold oxygen amount, the oxygen storage module 204 may determine the oxygen storage amount is greater than a threshold storage amount. The threshold storage amount may be an amount of oxygen that indicates NOx breakthrough.

The cylinder deactivation module 206 receives the fuel cutoff signal and the oxygen storage amount and determines whether to deactivate cylinders. The cylinder deactivation module 206 may deactivate the cylinder 118 in response to the fuel cutoff signal. The cylinder deactivation module 206 may monitor the oxygen storage amount during the DFCO mode and deactivate the cylinder 118 when the oxygen storage amount is greater than the threshold storage amount. The cylinder deactivation module 206 may deactivate one or more valves to deactivate the cylinder 118. The exhaust valve 130 may be deactivated to prevent exhaust gas from exiting the cylinder 118. The intake valve 122 may be deactivated to prevent fresh air from entering the cylinder 118.

The cylinder deactivation module 206 may deactivate the valves in various sequences and at various times. For example only, the valves may be deactivated such that a charge of exhaust gas is trapped within the cylinder 118. The intake valve 122 may be deactivated after an intake stroke of the piston. The exhaust valve 130 may be deactivated prior to the subsequent exhaust stroke of the piston.

The cylinder deactivation module 206 may instruct the cylinder actuator module 144 to deactivate one or more cylinders of the engine 102. In various implementations, a predefined group of cylinders may be deactivated jointly. The cylinder deactivation module 206 may also instruct the spark actuator module 126 to stop providing spark for deactivated cylinders.

By deactivating cylinders during DFCO mode, the engine 102 pumps less air through the exhaust system 132 than when the cylinders are active but not fueled. Decreasing the amount of air flowing through the exhaust system 132 reduces the amount of oxygen entering the catalyst 134. Thus, the oxygen storage amount of the catalyst 134 may not increase during DFCO mode. When DFCO mode ends and fueling resumes, less fuel is required to reduce the oxygen storage amount, resulting in improved fuel efficiency of the engine system 100.

Figure 3:
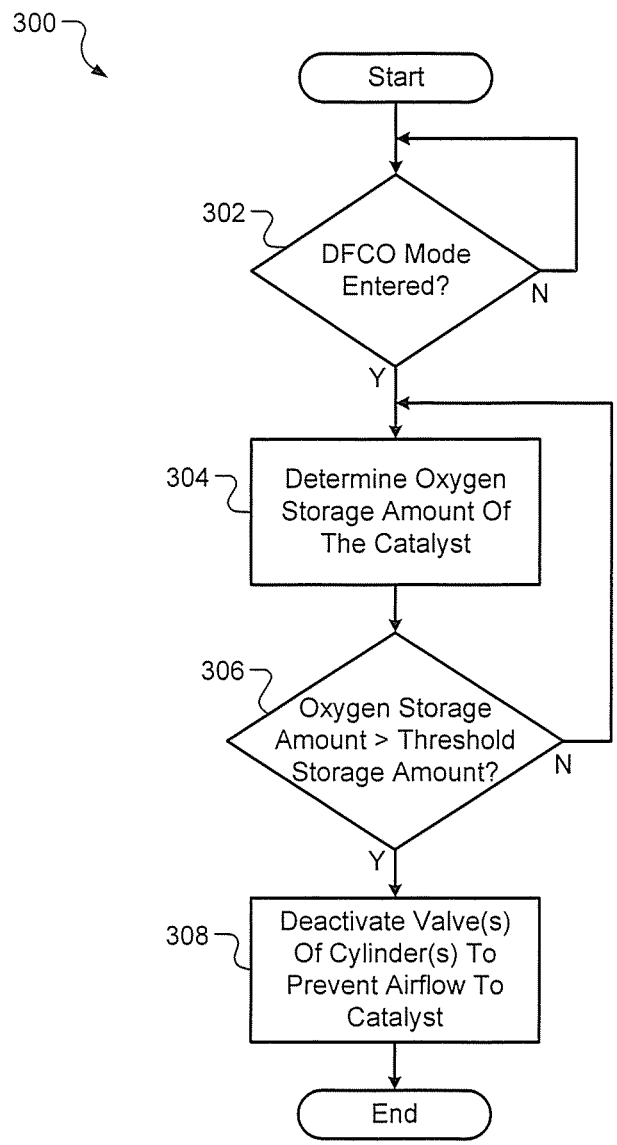
FIG. 3 is a flowchart that illustrates a method performed by the engine control module according to the principles of the present disclosure.

Referring now to FIG. 3, a flowchart 300 illustrates exemplary steps performed by the ECM 114. Control begins in step 302 when control determines whether deceleration fuel cutoff (DFCO) mode has been entered. Control may enter DFCO mode when overrun conditions exist, and the DFCO module 202 may generate the fuel cutoff signal. When DFCO mode is entered, control proceeds to step 304.

In step 304, control may determine the oxygen storage amount of the catalyst 134. For example only, control may determine the oxygen storage amount based on the oxygen signals from the oxygen sensors 136 and 138. In step 306, control compares the oxygen storage amount to the threshold storage amount. When the oxygen storage amount is greater than the threshold storage amount, control may proceed to step 308. Otherwise, control may continue to monitor the stored oxygen amount in step 304. In step 308, control deactivates one or more valves of one or more cylinders to prevent airflow to the catalyst 134 during DFCO mode.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a fuel cutoff module that generates a fuel cutoff signal when a deceleration fuel cutoff condition occurs,
    wherein the deceleration fuel cutoff condition occurs when a speed of a vehicle is greater than a speed threshold and an accelerator position is less than a position threshold;
    wherein fueling to M cylinders of an engine is disabled based on the fuel cutoff signal;
    wherein M is an integer greater than or equal to one;
    an oxygen storage module that determines an amount of oxygen stored in a catalyst; and
    a cylinder deactivation module that, after fueling to the M cylinders is disabled, deactivates the M cylinders in response to a determination that the amount of oxygen stored in the catalyst is greater than a predetermined oxygen amount.

2. The system of claim 1, wherein the cylinder deactivation module deactivates an intake valve and an exhaust valve of the M cylinders to prevent airflow from the M cylinders to the catalyst.

3. The system of claim 1, wherein the predetermined oxygen amount indicates nitrogen oxides (NOx) in exhaust gas downstream from the catalyst.

4. The system of claim 1, wherein the oxygen storage module determines the amount of oxygen based on a signal that indicates an amount of oxygen in exhaust gas downstream from the catalyst.

5. The system of claim 1, wherein the deceleration fuel cutoff condition occurs when the engine outputs negative engine torque.

6. The system of claim 1, wherein the cylinder deactivation module deactivates the M cylinders to prevent an increase in the amount of oxygen stored by the catalyst.

7. A method comprising:
generating a fuel cutoff signal when a deceleration fuel cutoff condition occurs,
wherein the deceleration fuel cutoff condition occurs when a speed of a vehicle is greater than a speed threshold and an accelerator position is less than a position threshold;
disabling fueling to M cylinders of an engine based on the fuel cutoff signal;
wherein M is an integer greater than or equal to one; and
determining an amount of oxygen stored in a catalyst; and, after fueling to the M cylinders is disabled, deactivating the M cylinders in response to the fuel cutoff signal in response to a determination that the amount of oxygen stored in the catalyst is greater than a predetermined oxygen amount.

8. The method of claim 7, further comprising:
deactivating an intake valve and an exhaust valve of the M cylinders to prevent airflow from the M cylinders to the catalyst.

9. The method of claim 7, wherein the predetermined oxygen amount indicates nitrogen oxides (NOx) in exhaust gas downstream from the catalyst.

10. The method of claim 7, further comprising:
determining the amount of oxygen based on a signal that indicates an amount of oxygen in exhaust gas downstream from the catalyst.

11. The method of claim 7, wherein the deceleration fuel cutoff condition occurs when the engine outputs negative engine torque.

12. The method of claim 7, further comprising:
deactivating the M cylinders to prevent an increase in the amount of oxygen stored by the catalyst.

13. The method of claim 7 wherein M is equal to a total number of cylinders of the engine.

14. The system of claim 1 wherein M is equal to a total number of cylinders of the engine.

* * * * *